No. 634,914. Patented Oct. 17, 1899.
S. H. SAYRE & E. LITTLE.
COTTON SEED PLANTER.
(Application filed Jan. 30, 1899.)
(No Model.) 4 Sheets—Sheet 4.
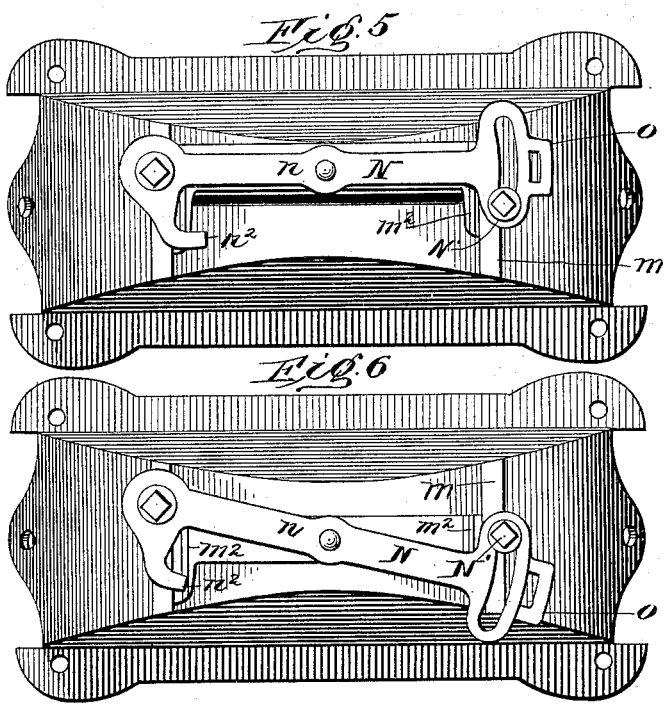
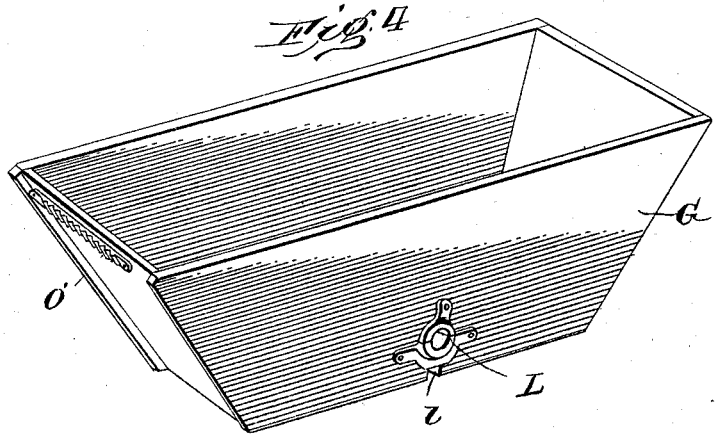
Witnesses:
J. M. Fowler Jr.
Alexander J. Stuart
Inventors:
Samuel H. Sayre and
Edwin Little
by Church & Church
their Attorneys.
THE NORRIS PETERS CO., PHOTO-LITHO., WASHINGTON, D. C.

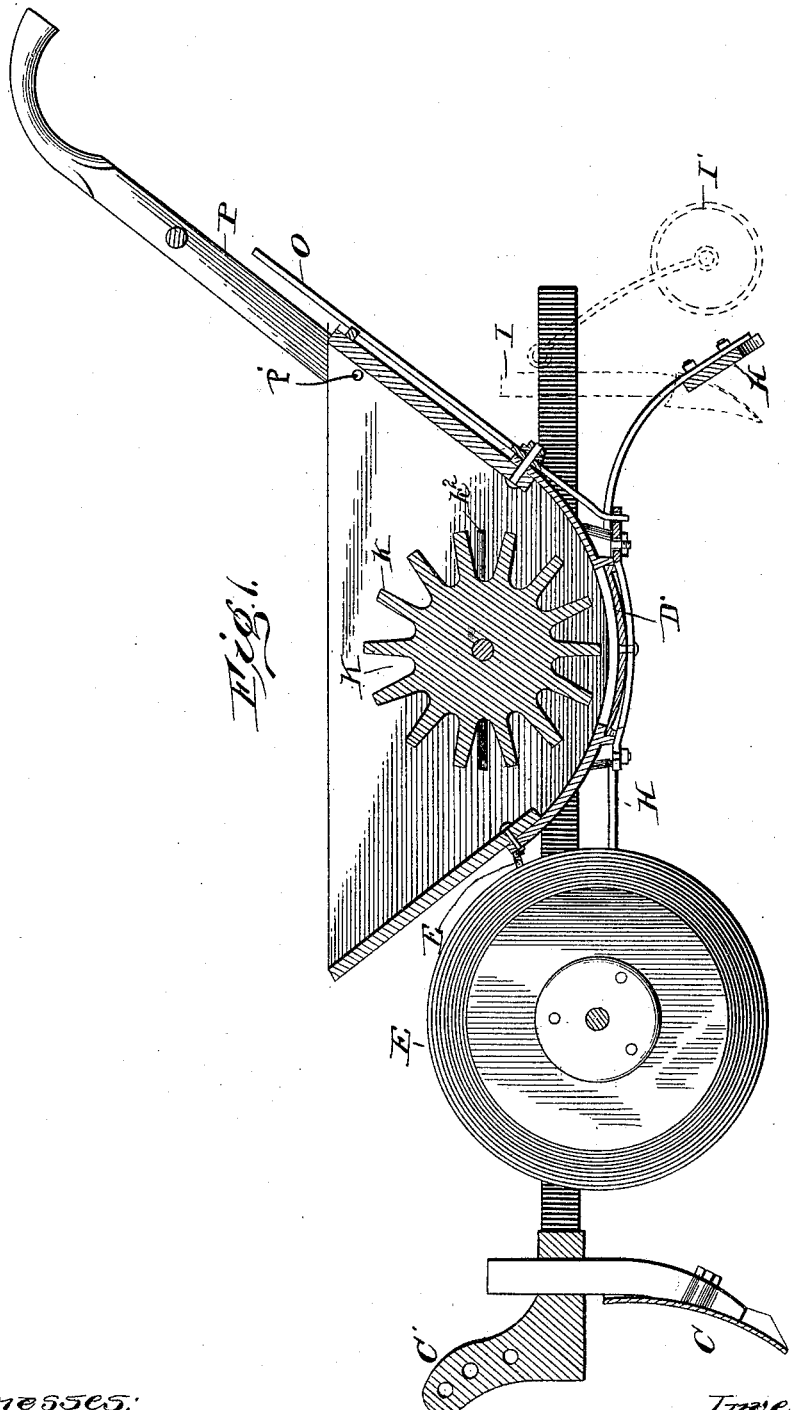

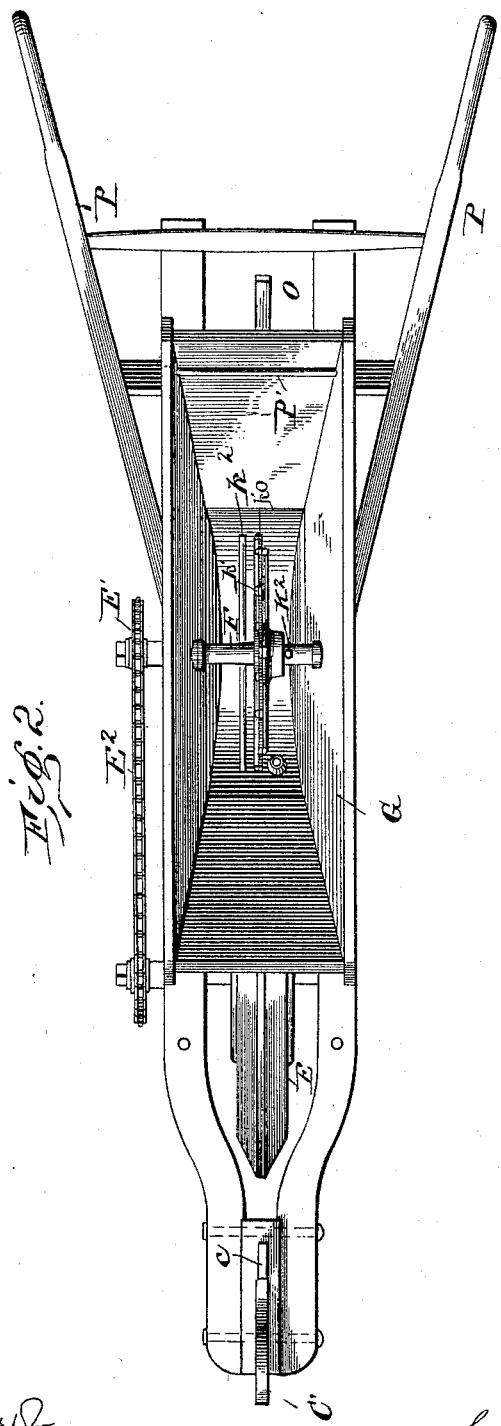

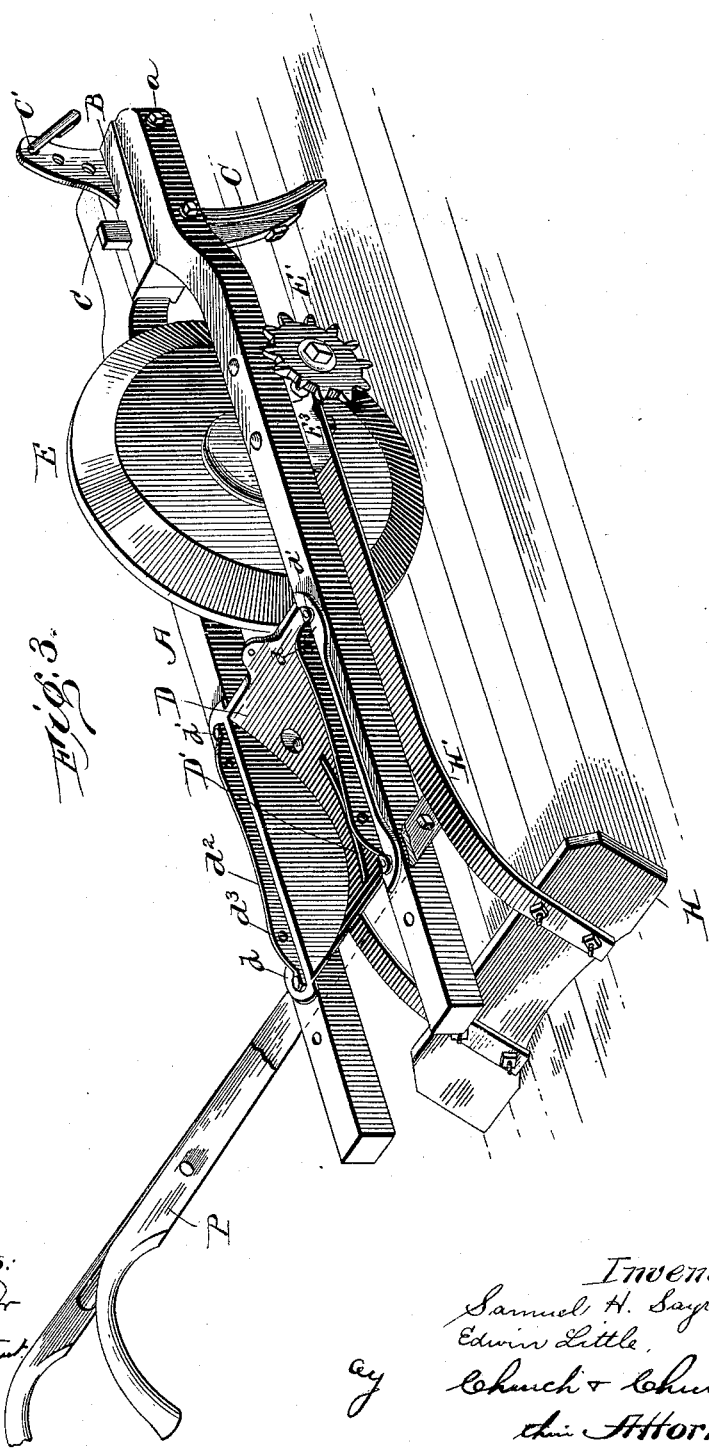

United States Patent Office.

SAMUEL H. SAYRE AND EDWIN LITTLE, OF HAMPTON, VIRGINIA, ASSIGNORS TO THE HAMPTON MANUFACTURING COMPANY, OF SAME PLACE.

COTTON-SEED PLANTER.

SPECIFICATION forming part of Letters Patent No. 634,914, dated October 17, 1899.

Application filed January 30, 1899. Serial No. 703,867. (No model.)

*To all whom it may concern:*

Be it known that we, SAMUEL H. SAYRE and EDWIN LITTLE, citizens of the United States, residing at Hampton, in the county of Elizabeth City and State of Virginia, have invented certain new and useful Improvements in Cotton-Seed Planters; and we do hereby declare the following to be a full, clear, and exact description of the same, reference being had to the accompanying drawings, forming a part of this specification, and to the letters of reference marked thereon.

This invention relates to improvements in apparatus for planting cotton-seed or seed of like nature, such as usually cling together by reason of the lint held thereby.

The objects of the invention are to produce an efficient device for dropping the seed evenly and at the same time a device which will embody the simplest possible mechanism and be of the simplest and strongest character, thereby adapting it for use by unskilled labor, such as usually found in the cotton district.

Referring to the accompanying drawings, Figure 1 is a vertical section with parts in elevation taken longitudinally through a planter embodying our present improvement. Fig. 2 is a top plan view of the planter. Fig. 3 is a perspective view with the hopper omitted in order to show the rigid frame and hopper-base. Fig. 4 is a detail view of the hopper detached; and Figs. 5 and 6 are bottom plan views of the hopper-base, showing the cut-off slide and its operating mechanism.

Like letters of reference in the several figures indicate the same parts.

In constructing a planter in accordance with our present invention, with the object in view of producing a rigid simple structure of cheap construction and easily assembled, we provide a rigid frame formed of two side bars A, Fig. 3, having their forward ends brought in toward each other and united together by transverse bolts $a$, a divided casting B being inserted between the ends of the frame for holding the colter or furrow-opener C and the clevis-post C'. The colter-stem $c$ passes through an opening between the two parts of the casting B, and consequently by a loosening of the bolts $a$ the colter may be adjusted and again clamped, as will be readily understood. The rear ends of the two side pieces A are rigidly united by the hopper-base D, which latter is preferably an integral casting having horizontal flanges $d$, which rest on the side pieces A and are bolted rigidly thereto by bolts $d'$ and vertical flanges $d^2$, within which the lower edges of the hopper fit and are held by suitable bolts passing through the apertures $d^3$.

The bottom of the hopper-base is formed segmental or curved from front to rear and is provided with a central longitudinal slot D', through which the seed are discharged by the forcing feed-wheel to be presently described.

Between the side pieces A and forward of the hopper we arrange a ground-wheel E, preferably made with a conical rim, to serve not only as a supporting and driving wheel, but also as an opener for the furrow, running in the track of the colter, and the bearings $E^3$ for this wheel E are bolted to the under side of the side pieces A, one end of the wheel shaft or axle carrying a sprocket-wheel E', over which a sprocket-chain $E^2$ runs for driving the feed-wheel, which latter is mounted on a shaft F, journaled in bearings in the sides of the hopper G.

In order to cover the furrow, we preferably provide a covering-board H, mounted on long springs H', the forward ends of which form the caps for the bearings $E^3$ and are held by the same bolts which hold said bearings in place. The board itself is located in rear of the hopper, and by reason of the long springs it has an exceedingly-flexible action for insuring a perfect covering for the furrow, regardless of the inequalities of the surface over which the machine is drawn. Obviously the covering-board may be dispensed with and ordinary covering means, such as the shovels (illustrated at I in dotted lines in Fig. 1) or the covering-wheel, (illustrated at I' in dotted lines in Fig. 1,) substituted without departing from the spirit of our invention, the other features of construction being applicable regardless of the particular covering means employed.

The hopper itself (lettered G) flares upwardly and is preferably formed at front and rear on a tangent to the circle on which the bottom of the hopper-base is struck, the object being to form a converging space between the end of the hopper and the feed-wheel, (lettered K in the drawings,) and which feed-wheel, it will be observed, is of less diameter than the circle on which the hopper-base is struck and is preferably provided with radially-projecting fingers $k$, which, however, do not project through the slot in the hopper-base, but travel in a circle, running very close thereto. Thus the seed drawn down by the feed-wheel will be pressed more and more as the feed-wheel rotates until they will be actually forced through the slot and discharged. To prevent the feed-wheel simply forming a kerf in the mass of seed contained in the hopper, the arms $k$ are preferably slightly staggered or provided alternately with oppositely-projecting ribs $k'$, as shown clearly in Fig. 2, and in addition stirrer-rods $k^2$ are arranged on the shaft F on each side of the feed-wheel, so as to keep the mass of seed agitated to further insure a continuous feed thereof.

In the manufacture of the machine it is highly desirable to reduce as much as possible the cost of assembling, and with this object in view the hopper is formed complete, separate from the machine, and the metal parts of the feed-wheel, with its shaft and sprocket-wheel, are independently assembled, and for the purpose of facilitating the assembling of the parts the bearing on one side of the hopper is divided horizontally, as illustrated at L in Fig. 4, and this side of the hopper is slotted, as at $l$. Thus the end of the feed-wheel shaft may be passed into a bearing on the opposite side of the hopper, and then the shaft is passed into the slot, with the feed-wheel within the base of the hopper, when the lower half of the bearing L may be applied and fastened in place by screws, as will be readily understood from the drawings. This having been done, the chain may be placed in position and the hopper adjusted to its base and fastened by bolts passing through the vertical flanges $d^2$.

To adapt the machine for handling seed of various sizes or having varying quantities of lint thereon, we provide the slot D' with a cut-off M, Figs. 5 and 6, which cut-off travels at right angles to the length of the slot, being guided in its movement by ribs $m$ on the bottom of the hopper-base and moved by the lever N, pivoted to the hopper-base at its forward end and centrally pivoted to the center of the cut-off at $n$. The rear end of this lever N is held up to its position by a bolt and washer N', and the lever itself in turn holds the cut-off in firm but sliding contact with the base of the hopper, for which purpose the cut-off is provided at its opposite ends with ribs or extensions $m^2$, which rest upon the operating-lever N in all positions of adjustment. We have illustrated the cut-off lever with a projection $n^2$ at the end nearest its pivot, upon which the rib $m^2$ of the cut-off may rest to prevent any tilting of the cut-off, should the same work loose by reason of wear.

To operate the cut-off lever, a cut-off-lever-operating handle O is pivoted on one of the bolts connecting the hopper and hopper-base at the rear end, the lower end of this handle working in a slot or opening $o$ in the cut-off lever and its upper end coöperating with a rack or toothed bar $o'$ on the rear end of the hopper to hold the parts in their adjusted positions.

For controlling the machine, handles P are connected at their lower ends to the side pieces A, and are also preferably connected at the upper ends of the hopper by a through-bolt P', which, in addition to bracing the hopper, will serve as a supporting means for the handles and constitute a cheap and efficient means of attachment.

Obviously the planter may be employed for dropping other tenacious substances than cotton-seed, and hence we do not wish to be limited to the particular use described in connection with this machine.

Having thus described our invention, what we claim as new, and desire to secure by Letters Patent of the United States of America, is—

1. In a planter such as described, the combination with the side pieces connected at the forward ends and rigid integral hopper-base having horizontal flanges connected to said side pieces and vertical flanges such as described, of a hopper supported by said vertical flanges without engaging the side pieces of the frame, a ground-wheel in advance of said hopper and controlling-handles extending in rear of said hopper; substantially as described.

2. In a planter such as described, the combination with the side pieces, the divided casting interposed between the forward ends of the side pieces and the colter clamped between the two parts of said casting, of a hopper-base rigidly connecting the rear ends of the side pieces, a hopper supported by said hopper-base, a ground-wheel journaled between said pieces forward of the hopper-base and controlling-handles; substantially as described.

3. In a planter such as described, the combination with the frame, of a hopper-base having side flanges resting on the frame a bottom plate curved from front to rear, and vertical flanges of a hopper supported by the said vertical flanges of the hopper-base and having its front and rear walls extending tangentially from the curved portion of the hopper-base, a feed-wheel journaled within the hopper and of less diameter than the circle upon which the curved portion of the hopper-base is struck, a ground-wheel and driving-gear interposed between the ground-wheel and feed-wheel; substantially as described.

4. In a planter such as described, the combination with the frame the hopper having longitudinal slot therein, and the feed-wheel journaled within the hopper, of a cut-off for the said slot, mounted in ways on the bottom of the hopper to move at right angles to the length of the slot, a cut-off lever journaled on the bottom of the hopper at one end and centrally pivoted to the center of the cut-off and an operating-handle pivoted on the hopper and coöperating with the rear end of the cut-off lever; substantially as described.

5. In a cotton-seed planter, the combination with the frame, the hopper having the curved bottom, provided with a longitudinal slot and feed mechanism, of a cut-off slide curved to conform to the bottom of the hopper and mounted in ways to travel at right angles to the length of the slot, of a cut-off lever pivoted on the hopper-bottom at one end and centrally pivoted to the slide to form an operating and supporting mechanism for said slide and an operating lever or handle pivoted on the hopper and coöperating with the rear end of the first-mentioned lever; substantially as described.

SAMUEL H. SAYRE.
EDWIN LITTLE.

Witnesses:
S. R. ADDISON,
S. C. REES.